United States Patent
Cullen

(12) United States Patent  (10) Patent No.: US 6,539,919 B2
Cullen  (45) Date of Patent:  Apr. 1, 2003

(54) IGNITION TIMING FOR ENGINE WITH DUAL INDEPENDENT CAMSHAFTS

(75) Inventor: Michael John Cullen, Northville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 216 days.

(21) Appl. No.: 09/739,088

(22) Filed: Dec. 16, 2000

(65) Prior Publication Data

US 2002/0073963 A1 Jun. 20, 2002

(51) Int. Cl.[7] .................................................. F02P 5/00
(52) U.S. Cl. .............................. 123/406.11; 123/406.23
(58) Field of Search ...................... 123/406.23, 406.11, 123/406.59, 406.52

(56) References Cited

U.S. PATENT DOCUMENTS

| | | | |
|---|---|---|---|
| 5,009,203 A | 4/1991 | Seki | |
| 5,090,383 A | * 2/1992 | Demizu et al. | ........ 123/406.23 |
| 5,117,784 A | 6/1992 | Schechter et al. | |
| 5,159,905 A | 11/1992 | Sugiuchi et al. | |
| 5,168,851 A | 12/1992 | Itoyama et al. | |
| 5,195,470 A | 3/1993 | Ikeura | |
| 5,222,465 A | 6/1993 | Sakamoto et al. | |
| 5,609,126 A | 3/1997 | Cullen et al. | |
| 5,622,144 A | 4/1997 | Nakamura et al. | |
| 5,680,834 A | 10/1997 | Szpak et al. | |
| 5,857,437 A | 1/1999 | Yoshioka | |
| 5,957,096 A | 9/1999 | Clarke et al. | |
| 6,006,725 A | 12/1999 | Stefanopoulou et al. | |
| 6,131,546 A | * 10/2000 | Vogt et al. | ............. 123/406.23 |
| 6,266,957 B1 | * 7/2001 | Nozawa et al. | ................ 60/284 |

* cited by examiner

Primary Examiner—John Kwon
(74) Attorney, Agent, or Firm—Brooks & Kushman; Carlos L. Hanze

(57) ABSTRACT

Optimum MBT and BDL ignition timing value are obtained from calibration values stored in stability limited (SL) and optimum power (OP) calibration tables using a power index (PI) value that is indicative of the relative desire of the driver for fuel economy or power to interpolate over the range of values in the SL and OP tables to calculate values of MBT and BDL that are optimal for all altitudes and levels of driver demand. The ignition timing value used at any point in time is preferably the lesser of the MBT value and the BDL value. The calibration values for MBT and BDL ignition timing are associated with cam timing values in cam timing tables so that ignition timing changes in lock step with the cam timing.

10 Claims, 3 Drawing Sheets

IGNITION TIMING FOR ENGINE WITH DUAL INDEPENDENT CAMSHAFTS

BACKGROUND OF THE INVENTION

1. Field of the Invention

This invention relates to electronic engine control and, more particularly, to a method and system for controlling ignition timing of an engine with dual independent camshafts.

2. Background Art

Variable cam timing systems, such as that described in U.S. Pat. No. 5,117,784 to Schechter et al., assigned to the assignee of the present invention, operate to vary the timing between the camshaft and the crankshaft to optimize engine performance over the entire range of engine operation. In my copending patent application, FMC 1286 PUS, incorporated herein by reference, a variable cam timing system is provided for an engine equipped with dual camshafts that permit the intake and exhaust cam timing to be controlled independently. Since cam timing greatly affects many aspects of engine control, care must be taken in both the control of, and reaction to, the requested timing. For example, spark for maximum best torque (MBT) and borderline spark (BDL) must be varied with valve timing in order to determine the optimal spark timing. Accordingly, there is a need for an ignition spark timing method for an engine with dual independent cam timing that optimizes control system behavior while minimizing complexity.

SUMMARY OF THE INVENTION

It is an object of the present invention to provide a method and system of ignition spark timing control for an engine having dual independent camshafts. It is another object of the present invention to provide a method and system for substantially reducing the ignition timing calibration effort while avoiding a proliferation of ROM lookup tables.

In accordance with a preferred embodiment of the present invention, MBT ignition timing calibration values and BDL ignition timing calibration values are stored in stability limited (SL) and optimum power (OP) calibration tables. Optimum MBT and BDL ignition timing values are then determined using a performance or power index (PI) value that is indicative of the driver's relative desire for fuel economy or power. The PI value is used to interpolate over the range of values in the SL tables to the values in the OP tables to calculate values of MBT and BDL that are optimal for all altitudes and levels of driver demand. The ignition timing value used at any point in time is preferably the lesser of the MBT value and the BDL value. The calibration values for MBT and BDL ignition timing are coordinated with calibration cam timing values so that optimal ignition timing as well as cam timing will be produced over the range of engine operation.

DETAILED DESCRIPTION OF THE PREFERRED EMBODIMENT(S)

Figure 1:
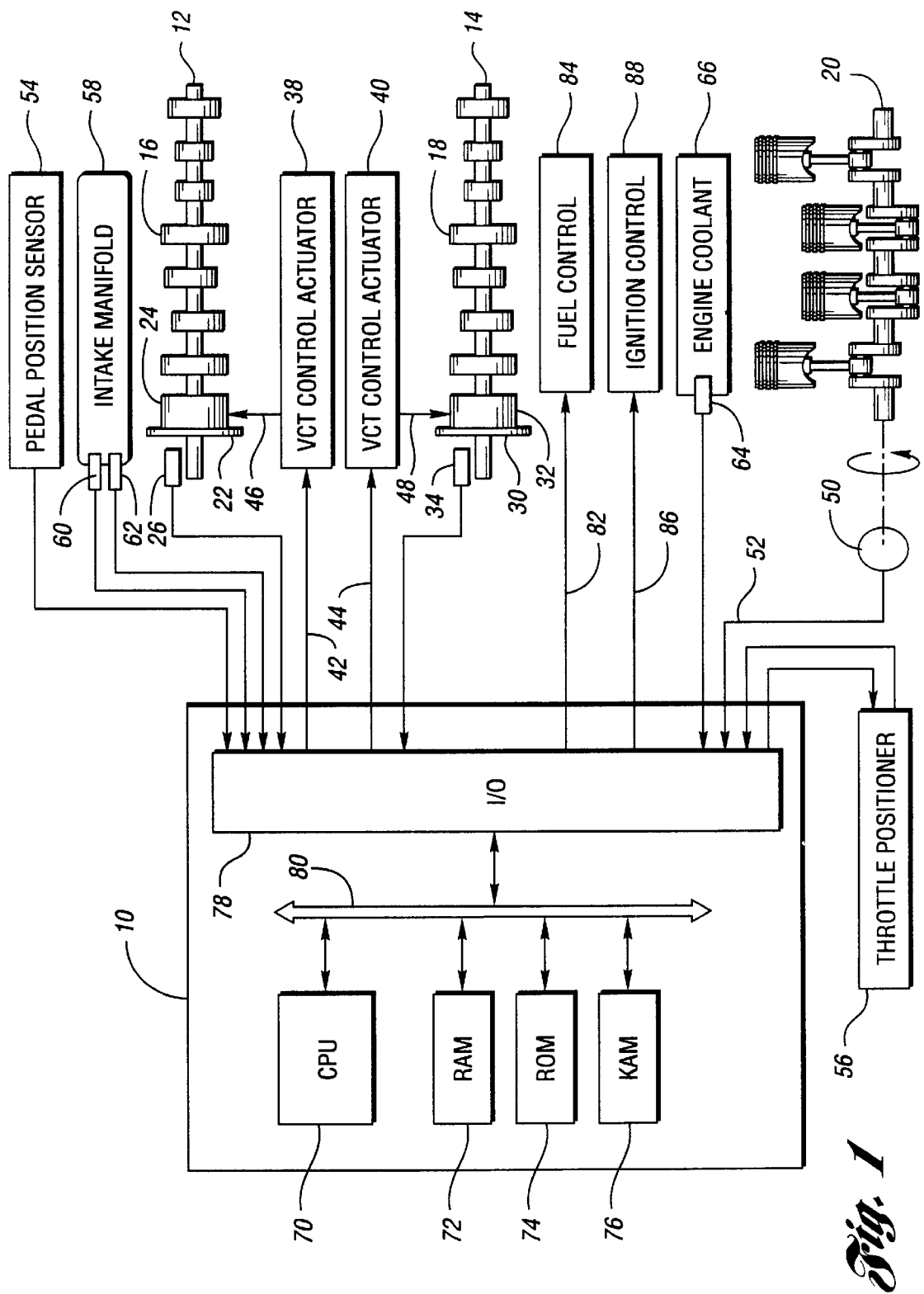
FIG. 1 is a schematic block diagram of a preferred embodiment of the system of the present invention.

Referring now to the drawings and initially to FIG. 1, an internal combustion engine of a vehicle supplies input data to and receives control signals from an electronic engine control (EEC) module generally designated 10. The engine comprises a variable position intake valve camshaft 12 and a variable position exhaust valve camshaft 14 each capable of independently altering the positional relationship of respective cam lobes 16 and 18 to a crankshaft 20. Such dual independent variable position camshafts are described in the aforementioned U.S. Pat. No. 5,117,784 to Schechter et al.

A pulse wheel 22 positioned on a drive gear 24 of the camshaft 12 comprises a plurality of teeth (not shown) positioned in fixed relationship to the cams 16 on the camshaft 12. A variable reluctance sensor (VRS) 26, of known type, detects the angular rotation of the teeth on the pulse wheel 22 as the camshaft rotates and generates a representative Variable Cam Timing/Cylinder Identification (VCT/CID) signal 28 that is supplied to EEC 10. Similarly, a pulse wheel 30 is positioned on a drive gear 32 of the camshaft 14. A VRS 34 detects the angular rotation of the teeth on the pulse wheel 30 as the camshaft rotates and generates a representative Variable Cam Timing/Cylinder Identification (VCT/CID) signal 36 supplied to EEC 10.

Figure 2:
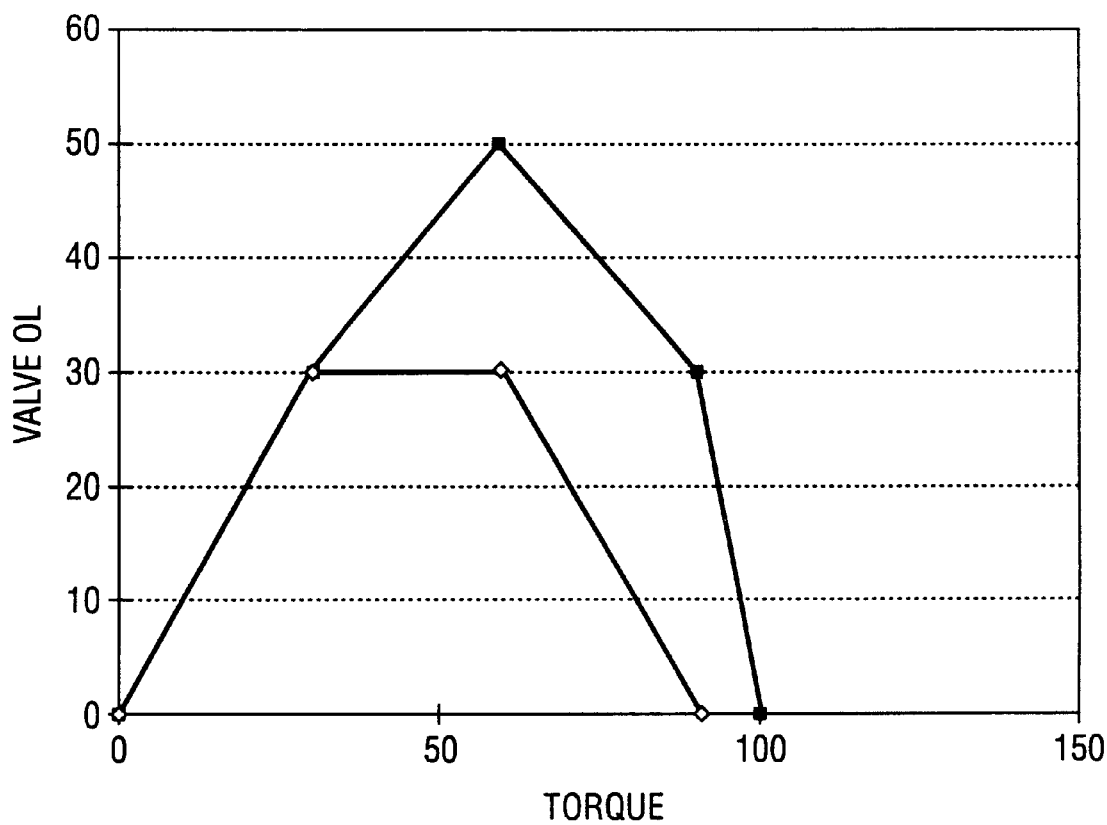
FIG. 2 is a plot comparing valve overlap calibration values for conventional and electronic throttle controls.

VCT control actuators 38 and 40 receive camshaft position signals 42 and 44, respectively, from EEC 10, which are indicative of a cam phase angle for the respective camshafts 12 and 14 in degrees from a default phase angle. The actuators 38 and 40 generate respective camshaft control signals 46 and 48 used to control the angular position of camshafts 12 and 14 relative to crankshaft 20. Camshaft position signals 42 and 44 preferably takes the form of a duty cycle signal to reduce sensitivity to voltage fluctuations. A Crankshaft Position Sensor (CPS) 50 generates a CPS signal 52 indicative of the rotational speed of the crankshaft 20. A sensor 54 senses the position of a vehicle operator actuated accelerator pedal and provides an accelerator pedal position signal as an input to the EEC 10. The EEC 10 responds to the signal from the sensor 54 and in accordance with an electronic throttle control (ETC) program drives an appropriate actuator 56 to position the intake air throttle (not shown). Thus, the throttle is set at a position commanded solely by EEC 10. In other words, the vehicle operator has no direct link with the throttle admitting air to the engine's intake manifold generally indicated at 58. Thus, the throttle can be set independently of pedal position, enabling a high valve overlap, and reduced pumping loss. The plot in FIG. 2 compares the valve overlap calibration values using ETC versus those used when the throttle is mechanically linked with the accelerator pedal. The high value of valve overlap available with ETC results from the removal of the constraint that torque must follow throttle movement on a one-to-one basis. This results in better fuel economy and lower $NO_x$. A temperature sensor 60 provides an air charge temperature input signal to the EEC 10 which is indicative of the temperature of the air charge entering intake manifold 58. A mass air flow meter 62 is provided for measuring mass air flow into the engine. Another temperature sensor 64 provides an engine coolant temperature input signal to the EEC 10 that is indicative of the temperature of coolant circulating through the engine coolant system generally indicated at 66. A pressure sensor may be included in the intake manifold 58 to measure barometric pressure or barometric pressure may be inferred as is well know in the art.

The EEC module 10 comprises a central processing unit 70, a random-access memory (RAM) 72 for temporary data storage, a read-only memory (ROM) 74 for storing control programs, a keep-alive-memory (KAM) 76 for storing learned values, Input/Output ports 78 including the usual analog to digital and digital to analog converter, and a conventional data bus 80. The EEC 10 receives the various input signals, and processes the data in accordance with a control program that preferably includes a camshaft timing subroutine for determining a desired timing of the camshafts 12 and 14 relative to the crankshaft 20. The control program also preferably includes a duty cycle calculation subroutine for computing separate correction signals activating the actuators 38 and 40 to correct the timing of the camshafts 12 and 14, respectively, to the desired relationship with the crankshaft 20, the position of which is determined from the CPS signal 52. The control program in the EEC 10 also provides an output control signal 82 to fuel control block 84 to control the amount of fuel injected by injectors within the engine, and an output control signal 86 to ignition control block 88 to control the ignition timing of the air/fuel mixture within the combustion chambers of the engine.

Software executed by the EEC 10 determines an intake valve closing (IVC) phase angle and valve overlap (OL) over the operating range of engine speed and indicated torque and generates camshaft position signals 42 and 44 as a function of the IVC and OL in accordance with the aforementioned patent application FMC 1286 PUS. The EEC 10 determines stability limited and optimum power ignition timing values for MBT and stability limited and optimum power ignition timing values for BDL and generates the ignition timing signal 86 using either the MBT or BDL value.

Figure 4:
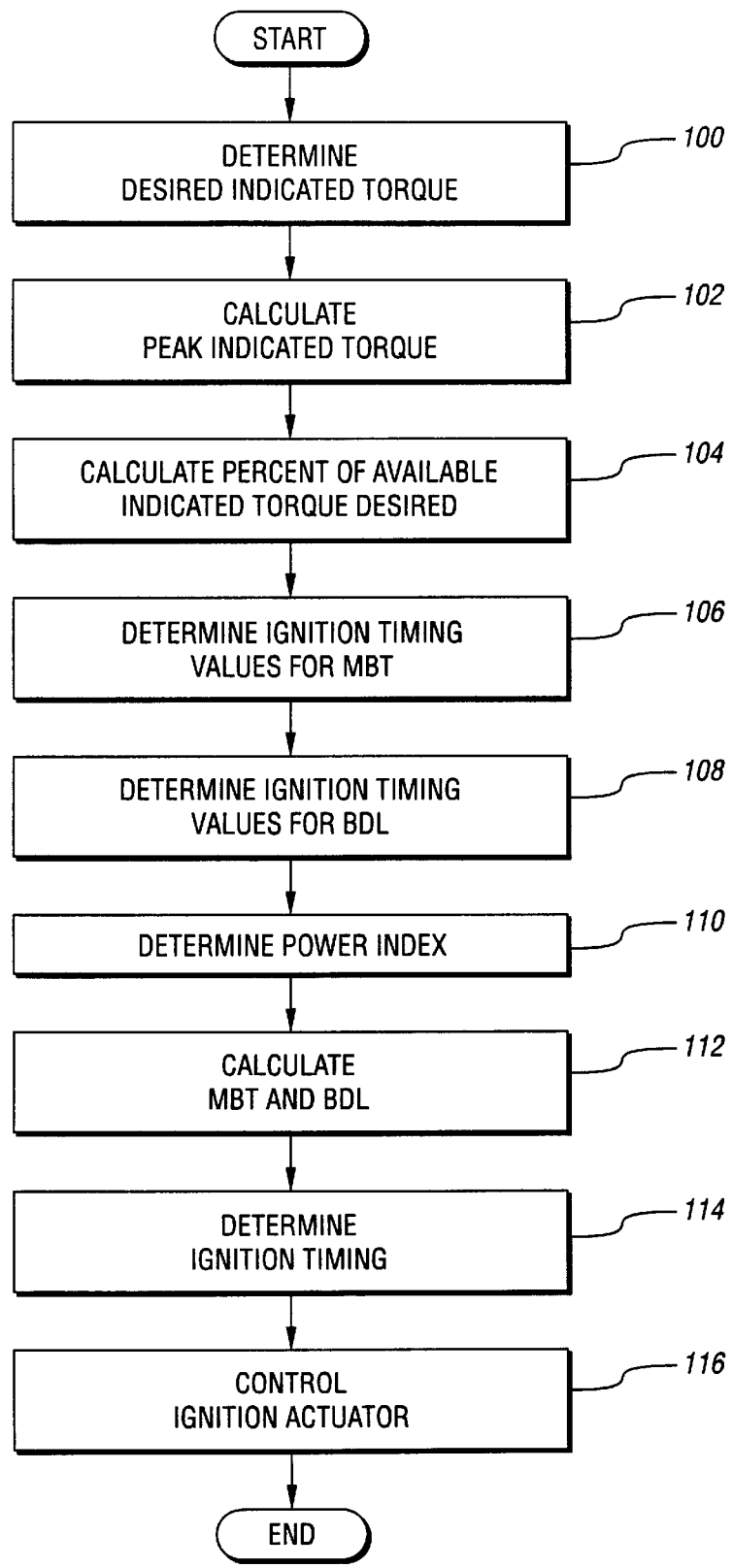
FIG. 4 is a flowchart showing the operation of a preferred embodiment.

The ignition timing routine of the present invention is shown in FIG. 4. The steps in FIG. 4 are preferably executed by the EEC 10 in a background loop. The ignition timing routine determines the operator desired engine indicated torque at block 100. The indicated torque is the total torque produced on the top of the piston and may be calculated from the equation:

$$\text{Desired\_indicated\_torque} = \text{desired\_brake\_torque} + \text{friction\_torque}$$

The desired brake torque is preferably obtained from a ROM based calibration lookup tableD as a function of engine speed (n) and accelerator pedal position (pp) as expressed by the following equation:

$$\text{Desired\_brake\_torque} = \text{table}D(n,pp)$$

The friction torque may be estimated from a ROM calibration tableE as a function of engine speed and air charge (air_chg) plus modeled accessory losses as expressed by the following equation:

$$\text{Friction\_torque} = \text{table}E(n, \text{air\_chg}) + \text{accessory\_loss}$$

At block 102, peak indicated torque is preferably obtained from a ROM based calibration lookup tableF, modified as indicated below for a given air charge temperature (act) and barometric pressure (bp).

$$\text{Peak\_indicated\_torque} = \text{table}F(n)*bp/29.92*\sqrt{560/(act+460)})$$

where tableF is a calibratable table of observed peak indicated torque at standard temperature (100° F.) and pressure (29.92 in.hg.) at the optimal cam timings for power (OP).

At block 104, the desired indicated torque as a percentage of the available peak indicated torque is calculated:

$$\text{Desired\_percent\_peak\_indicated torque} = \text{desired\_indicated\_torque}/\text{peak\_indicated\_torque}$$

The ignition timing calibration for best fuel economy and emissions is entered in ROM based calibration lookup tables referred to as stability limited (SL) ignition timing schedule tables. This calibration is often limited by combustion stability and these limits must be met at high altitude as well as sea level where the calibration was most likely derived. In block 106, an MBT ignition timing value, in degrees BTDC (Degrees Before Top Dead Center), is obtained for the current engine speed and load from a SL calibration table6. Table6 is populated with MBT stability limited calibration values as a function of load over the operating range of engine speed. Also in block 106, an MBT ignition timing value, in degrees, is obtained for the current engine speed and load from a OP calibration table7. Table7 is populated with MBT optimum power calibration values that are also a function of load over the operating range of engine speed. In block 108, BDL ignition timing values are obtained respectively from a ROM based stability limited calibration table8 and a ROM based optimum power calibration table9. These tables are populated with BDL ignition timing values as a function of engine speed and load. Load is the normalized pounds of air per cylinder filling and may be expressed as:

$$\text{Load} = \text{aircharge (lbs/cylinder-fill)}/(0.0027*\text{displacement}(L)/\text{number\_of\_cylinders}).$$

Figure 3:
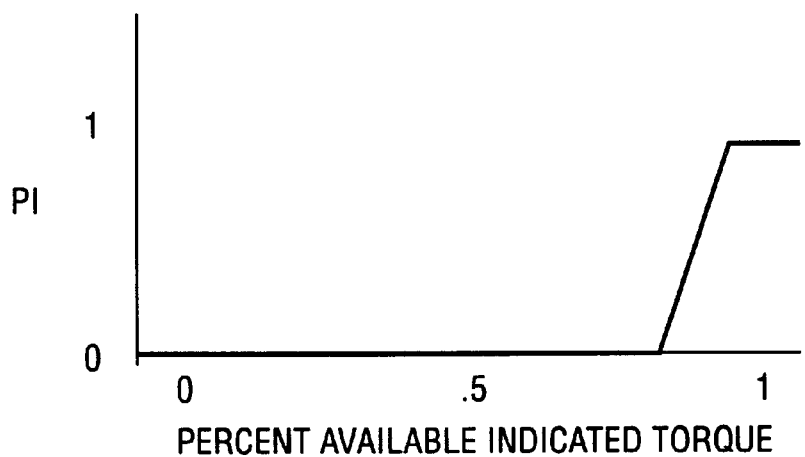
FIG. 3 is a chart of Power Index versus percent of available torque demanded.

At block 110, a power index (PI) is obtained from a ROM based lookup table10 populated with values from 0 to 1 in accordance with the chart of FIG. 3. The PI represents the relative desire of the customer for economy or power and is obtained as a function of the percent of available indicated torque demanded by the vehicle operator as calculated in block 104. An operator demand of less than approximately 80% of the peak indicated torque available produces a PI of 0 indicative of a desire for economy. From about 80% to 90% of peak available indicated torque demand, a PI of between approximately 0 and 1 are produced. Above approximately 90%, a PI of 1 is produced.

At block 112, the MBT and BDL are calculated using the PI obtained from block 110 to interpolate between the values contained in the MET tables (table6 and table7) and the BDL tables (table8 and table9). The MBT may be calculated in accordance with the following equations:

$$SL\_MBT = \text{Table6}(n, \text{load})$$

$$OP\_MBT = \text{Table7}(n, \text{load})$$

$$MBT = PI*OP\_MBT + (1-PI)*SL\_MBT$$

Borderline spark is defined in a similar manner to MBT spark in terms of standard conditions. The formula for interpolating versus PI is also analogous.

$$SL\_BDL = \text{Table8}(n, \text{load})$$

$$OP\_BDL = \text{Table9}(n, \text{load})$$

$$BDL = PI*OP\_BDL + (1-PI)*SL\_BDL$$

Spark is generally the lesser of BDL and MBT timing.

$$\text{Ignition timing} = \text{MIN}(BDL, MBT)$$

MBT and BDL must be calculated and varied with valve timing. Under the proposed calibration methodology, table6 and table8 are calibrated at the stability limited (SL) intake valve closing (IVC) and valve overlap (OL) associated with table1 and table2 of the aforementioned patent application FMC 1286 PUS. As described therein Table1 is populated with SL IVC calibration values as a function of demanded indicated torque over the operating range of engine speed. Also, table2 is populated with SL OL calibration values that are also a function of demanded indicated torque over the operating range of engine speed. At the time the technician finds the optimum SL valve timing settings on a dynamometer at a given indicated torque, MBT spark values are simultaneously found and entered in table6 versus the observed load. Table7 and table9 would similarly be calibrated at the optimum IVC and OL conditions for the optimum power (OP) valve timings populating table3 and table4 of the aforementioned patent application FMC 1286 PUS. As described therein these tables are populated with IVC and OL values for optimal power (OP) as a function of engine speed. Although the OP settings are described as a function of engine speed only, they are used at wide open throttle at any altitude, and at higher altitudes the load will be lower. The MBT and BDL spark timing is a first order function of load so table6, table7, table8, and table9 are a function of load.

While it is important for cam timing, to use desired torque and desired percent of peak torque for scheduling of cam timing devices, ignition timing uses load. The reason has to do with the dynamics of engine control. The first thing the controller sees is pedal position, from which a desired torque and desired percent of peak torque are calculated. The cam timing actuators are relatively slow and the torque variables are used to get these actuators moving in the right direction. On the other hand, the ignition timing actuator is very fast and the desired torque or pedal position are not as important at the time of ignition. For accuracy, ignition timing is based on load which is calculated from a mass air flow meter and is an accurate estimate of aircharge in the cylinder. The airflow associated with a cam timing change may take ½ second or more to reach equilibrium. During this time several combustion event will take place and it is desirable to have ignition timing at the optimal MBT or BDL spark setting. So, while cam timing and spark timing settings are stored in ROM as functions of desired indicated torque and load, respectively, under steady-state there is a one to one mapping from one variable to another and the spark timing changes in lock step with the cam timing. During transients however, lag the desired indicated torque, so making spark a function of load provides compensation for actual load not equal to steady-state desired load.

While the best mode for carrying out the invention has been described in detail, those familiar with the art to which this invention relates will recognize various alternative designs and embodiments for practicing the invention as defined by the following claims.

What is claimed:

1. A method of ignition timing comprising a sequence of the steps of:
    determining a stability limited ignition timing values as a function of engine speed and load;
    determining an optimum power ignition timing values as a function of engine speed and load;
    determining a power index value as a function of percentage of peak engine indicated torque available to meet a demanded indicated torque; and
    determining an ignition timing value based on said power index value, said stability limited ignition timing value and said optimum power ignition timing value.

2. The method defined in claim 1 wherein the ignition timing value is maximum spark for best torque.

3. The method defined in claim 1 wherein the ignition timing value is a borderline spark value.

4. A method defined in claim 1 further comprising the steps of:
    determining a second stability limited ignition timing values as a function of engine speed and load;
    determining a second optimum power ignition timing values as a function of engine speed and load; and
    determining a second ignition timing value based on said power index value, and said second stability limited ignition timing value and said second optimum power ignition timing value.

5. The method defined in claim 4 wherein said ignition timing value is maximum spark for best torque and said second ignition timing value is a borderline spark value.

6. The method defined in claim 5 wherein the minimum value of the maximum spark for best torque and the borderline spark value is selected to control the ignition timing of an engine.

7. The invention defined by claim 1 further including the steps of:
    determining a desired engine brake torque as a function of engine speed and accelerator pedal position;
    calculating a desired engine indicated torque from desired engine brake torque and friction torque;
    calculating an available peak engine indicated torque as a function of engine speed, air charge temperature, and barometric pressure; and
    calculating the percentage of peak engine indicated torque available to meet said desired engine indicated torque.

8. The invention define in claim 4 further including the steps of:
    determining a desired engine brake torque as a function of engine speed and accelerator pedal position;
    calculating a desired engine indicated torque from desired engine brake torque and friction torque;
    calculating an available peak engine indicated torque as a function of engine speed, air charge temperature, and barometric pressure; and
    calculating the percentage of peak engine indicated torque available to meet said desired engine indicated torque.

9. The method defined in claim 8 wherein said ignition timing value is maximum spark for best torque and said second ignition timing value is a borderline spark value.

10. The method defined in claim 9 wherein the minimum value of the maximum spark for best torque and the borderline spark value is selected to control the ignition timing of an engine.

* * * * *